United States Patent [19]
Ferrari

[11] 3,860,712
[45] Jan. 14, 1975

[54] COMPOSITION AND METHOD FOR TREATMENT OF ACNE OR SEBORRHEA
[75] Inventor: Richard A. Ferrari, Bethlehem, N.Y.
[73] Assignee: Sterling Drug Inc., New York, N.Y.
[22] Filed: Apr. 16, 1973
[21] Appl. No.: 351,249

[52] U.S. Cl. ............................................. 424/240
[51] Int. Cl. .......................................... A61k 17/06
[58] Field of Search .................................. 424/240

[56] References Cited
UNITED STATES PATENTS
2,460,776  2/1949  Vincent ................................ 167/58
3,472,931  10/1969  Stoughton ........................... 424/180
3,481,955  12/1969  Goldman ......................... 260/397.1

Primary Examiner—Henry A. French
Attorney, Agent, or Firm—B. Woodrow Wyatt; Thomas L. Johnson

[57] ABSTRACT

A composition for treatment of the conditions of acne or seborrhea comprising urea and a bile acid in alcohol media, optionally containing an antibacterial or lipase-inhibitory substance.

8 Claims, No Drawings

COMPOSITION AND METHOD FOR TREATMENT OF ACNE OR SEBORRHEA

This invention relates to a composition for treatment of acne or seborrhea and to a method of treating these conditions with said composition. More particularly, the invention relates to a composition comprising urea and a bile acid, and optionally in addition thereto a substance having antibacterial and/or antilipase activity; and to a method of using such compositions.

During puberty, the sebaceous glands of humans increase in secretory activity caused by increased androgen production. These sebaceous glands, which predominate on the face, forehead, nose and back, are present in clusters in the dermis and surround a central pilosebaceous canal. During secretion, the entire lipid-rich, sebaceous cell breaks down releasing cell debris as well as lipid material, known as sebum. Triglycerides comprise a major fraction of virgin human sebum. Anaerobic bacteria are normal residents of the pilosebaceous canal and partially hydrolyze the triglycerides to free fatty acids. The fatty acids have been implicated as irritants of the pilosebaceous canals, which are converted into non-inflammatory lesions (comedones) or into inflammatory lesions (papules, pustules, nodules and cysts).

An effective agent for relieving the conditions of acne is one which will effectively remove the sebum, fatty acids and keratin from the skin and comedones. Commerical preparations for treatment of acne contain mixtures of sulfur, resorcinol and salicyclic acid which cause peeling of the skin and the heads of the comedones. Superficial sebum is removed with skin cleansing agents such as soaps or medicated detergents containing the antibacterial hexachlorophene. Repeated application of peeling agents, together with soaps and detergents, leaves the skin dry and irritated.

The use of urea in hastening the healing of wounds and the treatment of certain skin conditions, such as ichthyosis and other hyperkeratotic skin diseases, is known. A combination of urea, sodium taurocholate and fused bentonite sulfur, with quince seed extract as a thickener, has been proposed as a composition for treating various skin infections (Vincent U.S. Pat. No. 2,460,776).

It has now been discovered that a combination of urea and an unconjugated bile acid in an alcohol base is surprisingly effective in forming complexes and/or inclusion compounds with the elements of human sebum thereby facilitating its ready removal, without leaving the skin dry and irritated. The composition of the invention comprises as the essential ingredients from 5 to 30 percent by weight of urea, from 0.1 to 1.0 percent by weight of an unconjugated bile acid, and from 20 to 60 percent by weight of an alcohol selected from the group consisting of ethanol and isopropyl alcohol. In addition, the composition may include various buffers, thickening agents and other excipients to form a solution, cream, ointment or gel suitable for topical application. When ethanol is used, it can be employed in the pure form or in a suitable denatured form. Mixtures of ethyl and isopropyl alcohol can also be used.

Preferred ranges of concentrations for the essential ingredients of the composition of the invention are from 10 to 25 percent by weight of urea, from 0.25 to 0.5 percent by weight of unconjugated bile acid and from 30 to 45 percent by weight of alcohol, preferably ethanol.

The unconjugated bile acids are those having the sidechain $-CH(CH_3)Ch_2CH_2COOH$ at the 17-position of the steroid nucleus, in contrast to the conjugated bile acids in which the bile acid is combined with glycine ($NH_2CH_2COOH$) or taurine ($H_2NCH_2CH_2SO_2H$) through an amide linkage, present as the sodium salt in naturally occurring "bile salts". Examples of unconjugated bile acids are deoxycholic acid, cholic acid, chenodeoxycholic acid, cholanic acid, hyodeoxycholic acid, dehydrocholic acid and lithocholic acid. A preferred acid is deoxycholic acid.

Various excipients may be incorporated in the compositions of the invention to form solutions, suspensions, gels, ointments or creams. These excipients include, for example, such substances as water, glycerol, carboxypolymethylene (carbopol), ethylhydroxyethylcellulose, methylcellulose (Methocel), tyloxapol (Superinone), fire-dried fumed silica (Cab-O-Sil), swelling clay, malic acid, tris(hydroxymethyl)aminomethane, triethanolamine and selected perfumes.

The pH of the composition is regulated to an approximately neutral value, between about 6.0 and 7.5. The initial mixture is usually on the acid side so that it is then necessary to add an amount of base, e.g., ammonium hydroxide or sodium hydroxide, sufficient to bring the mixture to the neutral point. The bile acid may then be present partially in the ionic form, that is, as a solution of its ammonium or sodium salt. In some gel formulations the thickening agents themselves serve to neutralize the acid and no pH adjustment is necessary. Occasionally, if basic buffers are used, the formulation may initially be on the alkaline side and addition of acid, e.g., hydrochloric acid, is then necessary.

The effectiveness of the composition of the invention was measured by determining its efficiency in removing artificial sebum from glass slides. The glass slides were first coated with a solution of 20 percent glycerin-egg albumin 1:1 or gelatin:chrome alum 1:0.1, and then coated with an artificial sebum prepared from synthetic materials according to percentage of comedone lipids given by Nicolaides et al., J. Invest. Derm. 54, 487–495 (1,970), and having the following composition: free fatty acids (C12–C24) 55 percent, triglycerides 7 percent, wax esters 14.6 percent, squalene 8 percent, cholesterol 12 percent and sterol esters 3.6 percent. This preparation was a solid at room temperature and when mixed with keratin had the consistency of an expressed comedone. The slides coated with artificial sebum-keratin were suspended in the test solution comprising urea, bile acid and dilute ethanol and agitated at about 80 cycles per minute at room temperature for about 30 minutes. The slides were rinsed with water, dried in air and weighed. The amount of sebum-keratin removed by the treatment was determined by the difference in weight of the dried slides before and after treatment with the test solution.

By this procedure it has been shown that the percentage of sebum-keratin removed by the combination of urea and bile acid was greater than the sum of the percentages removed when the urea and bile acid were tested separately, as shown in the following table:

| Expt. No. | Test Solution (42.5% ethanol) | Sebum-keratin Removal % ± standard error | No. Slides |
| --- | --- | --- | --- |
| 1. | 10% urea | 27.0 ± 1.2 | 10 |
| | 0.25% deoxycholic acid | 31.1 ± 1.3 | 10 |
| | sum of above | 58.1 ± 1.8 | |
| | combination of above | 75.6 ± 1.6 | 10 |
| 2. | 10% urea | 22.5 ± 2.0 | 10 |
| | 0.25% cholic acid | 22.3 ± 1.2 | 10 |
| | sum of above | 44.8 ± 2.3 | |
| | combination of above | 66.8 ± 2.3 | 10 |
| 3. | 10% urea | 28.5 ± 1.6 | 10 |
| | 0.25% chenodeoxycholic acid | 23.8 ± 1.2 | 10 |
| | sum of above | 52.3 ± 2.0 | |
| | combination of above | 75.0 ± 1.6 | 10 |

Statistical analysis of the above data provided a probability figure of <0.001 for each experiment, showing that the more-than-additive effect is highly significant.

A further aspect of the invention lies in the incorporation into the composition of urea and bile acid already described of an effective amount of a substance having antibacterial or lipase-inhibitory activity. Lipase-inhibitory compounds are those which decrease or prevent the action of lipase, an enzyme in the blood and tissues which causes hydrolytic cleavage of esters of fatty acids. A particularly useful group of compounds having both antibacterial and lipase-inhibitory activity are bis-biguanides of the type disclosed in U.S. Pat. No. 3,468,898, namely, 1,1'-bridged-bis(5-higher-alkylbiguanides). The bis-biguanide may be present in the composition of the invention in a concentration of from 0.05 to 1.0 percent by weight. An especially preferred specific bis-biguanide is 1,6-bis(2-ethylhexyl-biguanido)hexane.

The compositions of the invention are conveniently prepared in the form of soft gels or so called "splash" formulations. The gel formulations are applied to the skin, left there for a time ranging from several minutes to several hours and then washed away, with or without soap or detergents. The "splash" formulations are fluids of low viscosity with which the skin is irrigated and then promptly rinsed or washed.

The following examples will illustrate the invention without the latter being limited thereby.

EXAMPLE 1

Glass microscope slides were undercoated with gelatin:chrome alum 1:0.1 to obtain good adhesion between the slides and artificial sebum-keratin substrate which was subsequently applied. A solution of 10 percent by weight of urea and 0.25 percent by weight of deoxycholic acid in 34 percent by weight of ethanol was adjusted to pH 7.0 with sodium hydroxide. Each slide was suspended in a portion of the test solution and agitated at about 80 cycles per minute at room temperature for 30 minutes. The slide was then rinsed with water and dried and the difference in weight of the slide before and after treatment with the test solution determined. From an average of 10 slides so treated, 75.6 ± 1.6 percent of the sebum-keratin substrate was removed.

EXAMPLE 2

According to the procedure of Example 1, a solution of 10 percent by weight of urea and 0.25 percent by weight of cholic acid in 34 percent by weight of ethanol removed 66.8 ± 2.3 percent of sebum-keratin.

EXAMPLE 3

According to the procedure of Example 1, a solution of 10 percent by weight of urea and 0.25 percent by weight of chenodeoxycholic acid in 34 percent by weight of ethanol removed 75.0 ± 1.6 percent of sebum-keratin.

EXAMPLE 4

According to the procedure of Example 1, a solution of 17.5 percent by weight of urea and 0.25 percent by weight of deoxycholic acid in 34 percent by weight of ethanol removed 87.6 ± 1.4 percent of sebum-keratin. After 3 hours of incubation, 92.0 ± 0.63 percent of substrate was removed.

EXAMPLE 5

According to the procedure of Example 1, a solution of 10 percent by weight of urea and 0.5 percent by weight of deoxycholic acid in 34 percent by weight of ethanol removed 78.3 ± 2.1 percent of sebum-keratin. After 3 hours of incubation, 84.3 ± 2.9 percent of substrate was removed.

EXAMPLE 6

According to the procedure of Example 1, a solution of 20 percent by weight of urea and 0.5 percent by weight of deoxycholic acid in 20.4 percent by weight of ethanol removed 98.2 ± 0.6 percent of sebum-keratin.

EXAMPLE 7

According to the procedure of Example 1, a solution of 25 percent by weight of urea and 0.5 percent by weight of deoxycholic acid in 34 percent by weight of ethanol removed 93.0 ± 0.7 percent of sebum-keratin.

EXAMPLE 8

According to the procedure of Example 1, a solution of 17.5 percent by weight of urea and 0.5 percent by weight of deoxycholic acid in 34 percent by weight of ethanol removed 89.6 ± 1.6 percent of sebum-keratin.

Following are descriptions of dermatological formulations illustrating the application of the present invention.

FORMULATION 1

Deoxycholic acid (2.5 g.) was dissolved in 225.0 ml. of 95 percent ethanol, and the solution was mixed with 110 ml. of water and 62.5 g. of glycerol. Carboxypolymethylene (Carbopol 934, B. F. Goodrich Co.) (7.50 g.) was dispersed in the mixture, and 125.0 g. of urea was added. The mixture was stirred until the urea dissolved, and then adjusted to pH 6.35 with ammonium hydroxide (about 15.0 ml. prepared from 1 volume of 28 percent ammonium hydroxide and 4 volumes of water). A gel of good consistency was obtained which did not cause crystallization of urea on the skin.

FORMULATION 2

Malic acid (16.08 g.) was dissolved in 50 ml. of ammonium hydroxide solution (prepared from 28 percent solution diluted with 4 parts of water). Urea (75.0 g.) was added and the mixture warmed until the urea dissolved. To this solution was added a solution of 1.5 g. of deoxycholic acid in 135.0 ml. of 95 percent ethanol and 37.5 g. of glycerol. The pH was adjusted to 6.45 with ammonium hydroxide and water added to a total volume of 300.0 ml. There was thus obtained a so-called "splash" solution, which when tested with artificial sebum coated slides according to Example 1 removed 93 percent of the sebum substrate.

FORMULATION 3

Deoxycholic acid (5.0 g.) was dissolved in 450 ml. of 95 percent ethanol, and 125 g. of glycerol and 250 ml. of water were added. To this mixture was added 250.0 g. of urea, 6.7 g. of dl-malic acid, and 2.0 ml. of soap perfume (A115–170 Naarden), and the mixture was stirred with warming (below 40°C.) until all solid was dissolved. The pH was adjusted to 7.2 with 10 percent sodium hydroxide solution and distilled water added to a total volume of 1000 ml., affording a "splash" solution for skin application.

FORMULATION 4

Deoxycholic acid (5.0 g.) was dissolved in 450.0 ml. of 95 percent ethanol. To this solution were added in order 125.0 g. of glycerol and 214.0 ml. of distilled water with good mixing. To the latter mixture 15.0 g. of carboxypolymethylene (Carbopol 934) was added slowly with rapid, efficient stirring to obtain uniform dispersion. Then there were added 250.0 g. of urea and 2.0 ml. of soap perfume (A115–170 Naarden), and the mixture was stirred until all solid had dissolved. Ammonium hydroxide (40.0 ml. prepared from 28 percent solution diluted with 4 parts of water) was added rapidly and mixed until uniform. The resulting 25 percent urea gel had a pH of 6.7.

FORMULATION 5

Swelling clay (Benagna, National Lead Co.) (20 g.) was added to a solution of 100 g. of urea in 100 g. of water and mixed until a uniform paste was obtained. A solution of 2.0 g. of deoxycholic acid in 40.0 ml. of 95 percent ethanol was then slowly added with mixing followed by a solution of 50.0 g. of glycerol and 0.8 ml. of perfume in 140.0 ml. of 95 percent ethanol. The mixture was finally diluted with aqueous ethanol to a volume of about 500 ml., producing a gel of desirable consistency.

FORMULATION 6

A solution of 250 g. of urea in 190 g. of distilled water and 180 g. of glycerol was prepared at 25°–30°C. Fire-dried fumed silica (Cab—O—Sil M-5) (50 g.) was added and dispersed in the urea solution with stirring. To a solution of 5 g. of deoxycholic acid and 1.8 g. of perfume in 305 g. of absolute ethanol (denatured with tertiary butanol and brucine sulfate) was added 7.5 g. of ethylhydroxyethylcellulose (Hercules) and the mixture heated until a clear solution was formed. The latter solution was added to the urea solution with stirring, followed by the addition of 10 ml. of tyloxapol (Superinone) with vigorous stirring. To this mixture was added a solution of 5 g. of 1,6-bis(2-ethylhexylbiguanido)hexane in 62.5 g. of absolute ethanol, and stirring was continued until the mixture was homogeneous. This formulation forms a soft gel upon standing and becomes fluid when agitated and stirred.

FORMULATION 7

Urea (250.0 g.) was dissolved in 133.3 g. of distilled water and 180.0 g. of glycerol with stirring and gentle heating. To this solution was added 50.0 g. of fire-dried fumed silica (Cab—O—Sil M-5) with rapid stirring until a thin uniform suspension was formed. To a solution of 5.00 g. of deoxycholic acid and 1.8 g. of perfume in 334.9 g. of absolute alcohol (denatured with tertiary butanol and brucine sulfate) and 27.84 g. of distilled water was added 7.50 g. of methylcellulose (Methocel HB) and the mixture stirred until evenly dispersed. The latter mixture was added to the urea solution with good mixing, and then 5.00 g. of tyloxapol (Superinone) in 5.00 g. of absolute ethanol was added, and the mixture was stirred for 5–10 minutes. A soft gel was formed.

FORMULATION 8

A formulation the same as that of Formulation 7 was prepared except that 1.00 g. of 1,6-bis(2-ethylhexylbiguanido)-hexane was also added at the end of the preparation.

FORMULATION 9

A formulation the same as that of Formulation 7 was prepared except that 0.50 g. of 1,6-bis(2-ethylhexylbiguanido)-hexane was also added at the end of the preparation.

FORMULATION 10

To a mixture of 125 g. of glycerol and 225 ml. of water was added 6.1 g. of tris(hydroxymethyl)methylamine and 250.0 g. of urea, and the mixture was stirred and warmed at 30°–35°C. was added a solution of 5.0 g. of deoxycholic acid and 1.8 g. of perfume soap in 366.6 g. of absolute denatured ethanol. The mixture was stirred well and the pH (8.8) was adjusted to 6.75 by adding 10 percent aqueous hydrochloric acid (17.8 ml.). There was obtained a "splash" solution which was stable upon autoclaving.

FORMULATION 11

A formulation corresponding to Formulation 10 above was prepared except that the tris(hydroxymethyl)methylamine was replaced by 7.45 g. of triethanolamine. The mixture has a pH 8.5 before and 6.75 after addition of hydrochloric acid.

I Claim:

1. A composition for treatment of acne or seborrhea which comprises from 5 to 30 percent by weight of urea, from 0.1 to 1.0 percent by weight of an unconjugated bile acid, and from 20 to 60 percent by weight of an alcohol selected from the group consisting of ethanol and isopropyl alcohol.

2. A composition according to claim 1 in which the unconjugated bile acid is deoxycholic acid and the alcohol is ethanol.

3. A composition according to claim 1 in which the urea is present in a concentration of from 10 to 25 percent by weight, the unconjugated bile acid is deoxycholic acid, present in a concentration of from 0.25 to 0.5 percent by weight, and the alcohol is ethanol present in a concentration of from 30 to 45 percent by weight.

4. A composition according to claim 1 which contains an effective amount of a substance having antibacterial or lipase-inhibitory activity.

5. A composition according to claim 4 in which the antibacterial and lipase-inhibitory compound is a bisbiguanide compound, present in concentration of from 0.05 to 1 percent by weight.

6. A composition according to claim 5 in which the biguanide compound is 1,6-bis(2-ethylhexylbiguanido)hexane.

7. A method of treating the conditions of acne or seborrhea by removing excess sebum and keratin from the skin, which comprises applying to the affected skin area a composition according to claim 1 and then rinsing away the composition from the skin.

8. A method of treating the conditions of acne or seborrhea by removing excess sebum and keratin from the skin, and by inhibiting bacterial growth or inhibiting the break-down of glycerides to fatty acids, which comprises applying to the affected skin area a composition according to claim 4 and then rinsing away the composition from the skin.

* * * * *